US006313434B1

(12) United States Patent
Patterson et al.

(10) Patent No.: US 6,313,434 B1
(45) Date of Patent: Nov. 6, 2001

(54) METHOD FOR CREATION OF INCLINED MICROSTRUCTURES USING A SCANNED LASER IMAGE

(75) Inventors: Daniel G. Patterson, Morgan Hill, CA (US); Michael A. Kadar-Kallen, Harrisburg, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/321,799

(22) Filed: May 27, 1999

(51) Int. Cl.$^7$ .................................................. B23K 26/36
(52) U.S. Cl. ........................................................ 219/121.69
(58) Field of Search ......................... 219/121.68, 121.69, 219/121.8

(56) References Cited

U.S. PATENT DOCUMENTS

| | | | |
|---|---|---|---|
| 4,734,550 | * | 3/1988 | Imamura et al. . |
| 4,940,508 | | 7/1990 | Shamouillian et al. . |
| 4,940,881 | | 7/1990 | Sheets . |
| 4,970,600 | * | 11/1990 | Garnier et al. .................. 219/121.68 |
| 5,195,163 | | 3/1993 | Burns et al. . |
| 5,296,673 | | 3/1994 | Smith . |
| 5,310,986 | | 5/1994 | Zumoto et al. . |
| 5,313,043 | | 5/1994 | Yamagishi . |
| 5,491,319 | | 2/1996 | Economikos et al. . |

FOREIGN PATENT DOCUMENTS 3-89518 * 4/1991 (JP) .
11-77342 * 3/1999 (JP) .

OTHER PUBLICATIONS

IBM Technical Disclosure Bulletin, "Efficient and Relaible Optical Scanning System for Laser Processing of Three–Dimensional Objects", vol. 35, No. 4A, Sep. 1992.

IBM Technical Disclosure Bulletin, "Scanning Excimer Ablation Tool" vol. 34, no. 7A, Dec. 1991.

* cited by examiner

Primary Examiner—Geoffrey S. Evans
(74) Attorney, Agent, or Firm—DeLio & Peterson, LLC; Kelly M. Reynolds; Margaret A. Pepper

(57) ABSTRACT

A system for controlling inclination and depth of ablation of a polymer planar waveguide or semiconductor wafer substrate utilizes a laser which directs the beam at the substrate to ablate portions of the surface thereof and a translatable stage for moving the substrate relative to the beam to create a path of ablated material from the surface. The velocity of the substrate is controlled relative to ablation rate of material from the surface or the dimension of the beam is controlled along the path of ablated material to create a desired inclination and depth of ablated material in the path. The depth of ablated material is a function of the beam width along the path of ablated material, workpiece velocity and ablation rate and is substantially controlled by the formula:

$$D=R(W/V)$$

where D is the depth of ablated material, R is ablation rate, W is beam dimension along the path of ablated material, and V is workpiece velocity.

22 Claims, 3 Drawing Sheets

METHOD FOR CREATION OF INCLINED MICROSTRUCTURES USING A SCANNED LASER IMAGE

BACKGROUND OF THE INVENTION

1. Field of the Invention

This invention relates to the processing of workpieces with an energy beam and more particularly to creation of controlled inclined trenches and other microstructures in semiconductor wafers or polymer planar waveguides using a scanned laser.

2. Description of Related Art

Inclined surfaces in microstructures of semiconductor wafer substrates or polymer planar waveguides have been produced using image projection of stationary apertures of variable size, such that the aperture dimensions change while the laser is firing, or raster scanning a focused spot, increasing the number of scans toward the deep end of the ramp.

For example, U.S. Pat. No. 5,296,673 discloses an excimer laser projection system for ablation of a target material which has a lens system for projecting a mask pattern on the workpiece. The lens system is telecentric toward the target end of the projection path. The workpiece is moveable to define the area to be removed. In use the size of projected image area to be ablated from the target is adjusted substantially without altering the relative positions of the target.

U.S. Pat. No. 5,491,319, assigned to the assignee of the instant application, discloses a laser ablation apparatus and method in which a mechanism in the path of the beam shapes the cross-section of the beam and includes first and second linear actuators on opposite sides of the beam path which include a pluarity of linear members which are individually inserted and retracted into and out of the beam path to shape the beam. U.S. Pat. No. 4,940,508 discloses an excimer laser material removal system which includes an aperture structure having a plurality of openings of different size and shape and a stage movable in at least the X and Y directions.

U.S. Pat. No. 4,940,881 discloses control of the angles of the walls of the vias being ablated by an excimer laser by interposing refractive elements between the masks and the workpieces and rotating the refractive elements about axes parallel to the optical axis. The refractive element may have parallel faces or faces at an angle to each other.

The prior art does not easily control the inclination of angle and depth of the microstructures for application in photonic circuitry. Specifically, problems currently exist in the redirection of electromagnetic energy from the plane of circuitry to a direction out of the plane. When these structures are machined using laser energy, it has been found that the position of the beam spot (for raster-scan technique) or image dimensions (for variable-aperture technique) must be carefully controlled to produce repeatable results.

Bearing in mind the problems and deficiencies of the prior art, it is therefore an object of the present invention to provide a method and apparatus for controlling the angle and depth of inclined surfaces in microstructures by laser techniques.

It is another object of the present invention to provide a method and apparatus for creating controlled inclined surfaces by laser which utilizes available equipment.

It is a further object of the present invention to provide a reliable process for creation of inclined surfaces of controlled angle and depth of microstructures by excimer laser whose results may be interpreted through equations to establish desired parameters.

SUMMARY OF THE INVENTION

The above and other objects and advantages, which will be apparent to one of skill in the art, are achieved in the present invention which is directed to, in a first aspect, an apparatus for controlling inclination and depth of ablation of a workpiece by an energy beam comprising a workpiece, means for generating an energy beam and directing the beam at the workpiece to ablate portions of the surface thereof and means for moving the workpiece relative to the beam to create a path of ablated material from the workpiece surface. There is also provided either a means for controlling the velocity of the workpiece relative to ablation rate of material from the workpiece surface or a means for controlling the dimension of the beam along the path of ablated material to create a desired inclination and depth of ablated material in the path.

In another aspect, the present invention provides a method of controlling inclination and depth of ablation of a workpiece by an energy beam. Initially, an energy beam is generated and directed at the workpiece to ablate portions of the surface thereof. The workpiece is moved relative to the beam to create a path of ablated material from the workpiece surface. The velocity of the workpiece is controlled relative to ablation rate of material from the workpiece surface to create a desired inclination and depth of ablated material in the path. Alternatively, the dimension of the beam along the path of ablated material is controlled to create the desired inclination and depth of ablated material in the path.

The beam has a width along the scanning direction or velocity vector along the path of ablated material. Preferably the depth of ablated material is a function of the beam width, workpiece velocity and ablation rate. More preferably, the depth of ablated material is substantially controlled by the formula:

$$D = R * (W/V)$$

wherein D is the depth of ablated material, R is ablation rate, W is beam dimension along the path of ablated material, and V is workpiece velocity. The path of ablated material has a slope S at the end thereof substantially determined by the formula:

$$S = \pm R/V$$

Preferably, the beam is a laser beam which may be either a continuous wave laser beam or a pulsed laser beam.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2c is a perspective view of the trench created in a semiconductor substrate by scanning the beam of FIG. 2a.

FIG. 3c is a perspective view of the trench created in a semiconductor substrate by scanning the beam of FIG. 3a.

FIG. 4c is a perspective view of the trench created in a semiconductor substrate by scanning the beam of FIG. 4a.

DESCRIPTION OF THE PREFERRED EMBODIMENT(S)

Figure 1:
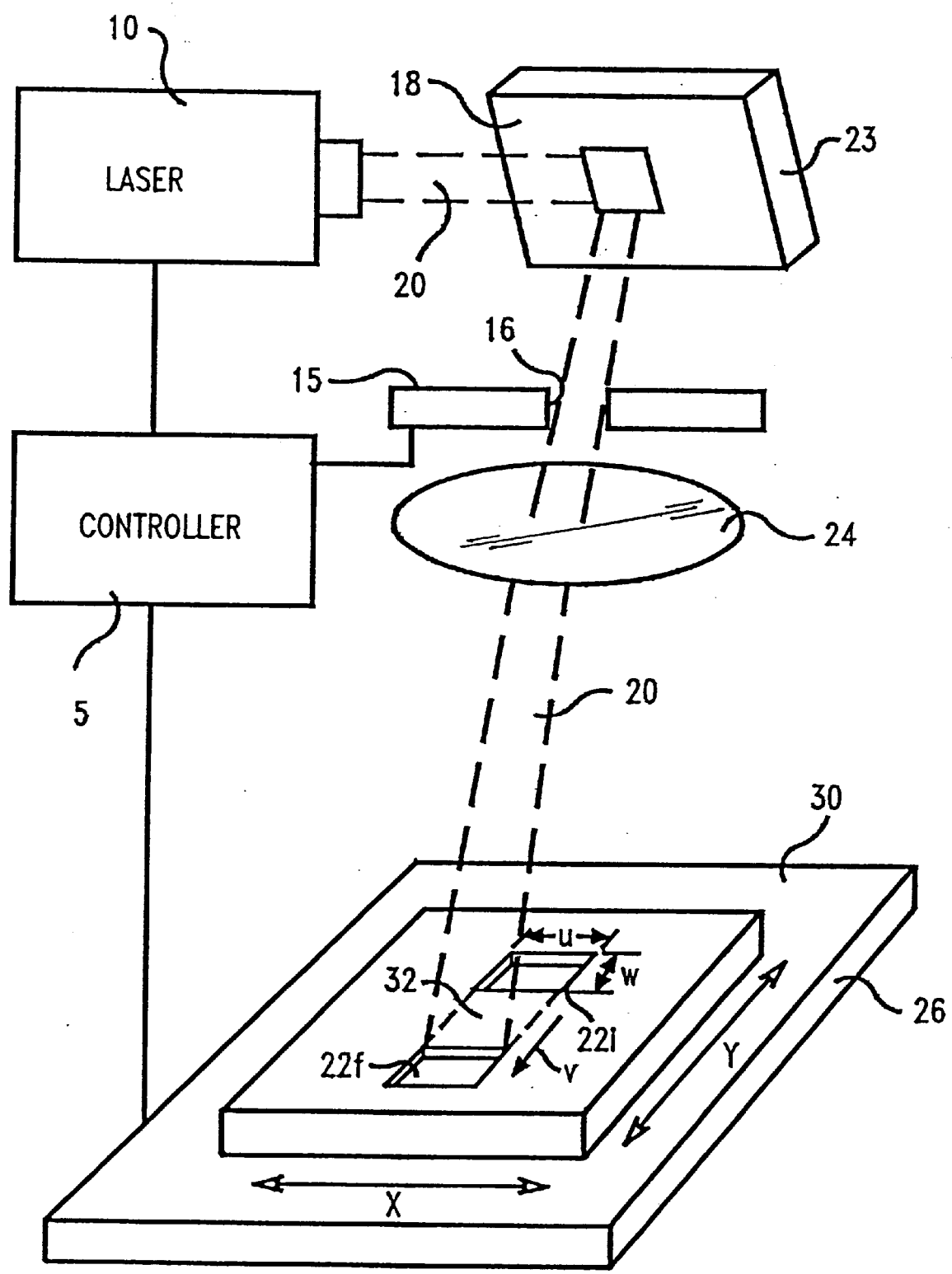
FIG. 1 is a perspective and schematic view of the apparatus employed in the present invention.

In describing the preferred embodiment of the present invention, reference will be made herein to FIGS. 1–7 of the drawings in which like numerals refer to like features of the invention. Features of the invention are not necessarily shown to scale in the drawings.

The present invention is directed to a system and method of ablation of material from a workpiece with an energy beam such as a laser or electron beam. Preferably, an excimer laser of suitable wavelength for material removal is used to evenly illuminate an aperture of fixed or variable size. Optics produce an image of the aperture at the surface to be machined, and a means for translating or moving the image relative to the plane of the workpiece surface at a constant velocity is provided. Control means for gating the laser illumination on and off at specific times or at specific locations are also provided.

The present invention may be used to cut microstructures in polymer planar waveguides, ceramic semiconductor wafer substrates or any material that can be ablated with an energy beam.

In practice the workpiece surface is set in motion at velocity V relative to the beam, and this velocity is kept constant as long as the laser illumination is on. Usually the desired result is to produce a trench in the surface of the substrate of specific length and/or end point positions.

If the dimension of the aperture image along the velocity vector is some nonzero W, and the depth of material removed per unit time in an illuminated area (etch rate) is R, the resulting profile of the trench along the velocity vector shows a flat floor of depth D:

$$D=R*W/V$$

with an inclined ramp at each end, with one ramp going down from the top (e.g., workpiece) surface to the floor of the trench, and one ramp going up from the trench floor back to the top (e.g., workpiece) surface. The length of this ramp along the velocity vector is W, and the slope S is thus:

$$S=\pm R/V$$

None of the parameters W, V or R are required to be changed during the process of the present invention. This enhances process reliability while reducing equipment complexity. Accordingly, there is fine control of the slope of the ramp, since W, R, and V may be controlled independently.

For example, if 45° slopes are desired, the process engineer need only set V=R. If the etch rate R for a material/laser parameter combination is not known, W and V may be set freely, and the depth D of the resulting trench measured using standard techniques such as stylus profilometry, confocal microscopy, interferometry and others. R is then calculated through the relation:

$$R=D*V/W$$

Once R is known, V and W may be chosen to obtain a trench of desired depth and ramp slope.

The width of the trench and ramps may be controlled independently by choosing the dimension of the aperture image normal to the velocity vector. This generally has little or no effect on the profile of the trench and ramps.

The etch rate R may be the result of material removal by either continuous wave or pulsed lasers. In the latter case, the etch rate is a time average depending on the etch depth per pulse and the number of pulses per unit time. If a higher value of R is desired, the laser parameters may be changed; for example, increasing the laser power, or multiple passes may be made over a given trench, increasing the depth of the trench and the angle of the ramps with each pass. For fine control, both methods may be used in combination. If a lower value of R is desired, the number of passes may be reduced (to no fewer than one) and/or the laser parameters may be changed; for example, reducing laser power. In practice, either or both of the ramp ends may be used in the finished product, or a trench may be made for the purpose of producing one or two single-ramped products.

For a given set of laser parameters, the value of R depends on material qualities. For multilayer structures, the effective value of R will typically be different for each layer. The slope of the ramp (±R/V) will then be different for each layer. This may be employed to produce new product features, or the value of R/V may be changed during the scan to equalize the slopes as much as possible. However, this may involve a higher level of equipment complexity, such that the slope of the resulting ramp may exhibit local discontinuities.

The process uses available equipment, a fixed aperture, a single axis of motion, and a laser of constant or variable power, along with a controller to control the workpiece velocity relative to the laser beam, beam dimensions and other parameters described above. It offers precise control of ramp slope through a reliable process, the results of which may be interpreted through the aforementioned equations to establish parameters such as V and R.

The preferred apparatus for creation of the inclined microstructures using a scanned laser image is shown in FIG. 1. A laser 10 operated by a microprocessor-based controller 5 emits an energy beam 20 which is reflected off the surface 18 of mirror 23 and passes through a plane 15 having therein an aperture 16 which determines the configuration of the beam 20. After passing through optical lens 24, beam 20 produces an image of the aperture on the surface of workpiece 30, such as a ceramic semiconductor substrate. Aperture 16 may be fixed or variable to produce the desired image dimensions on the substrate. Controller 5 controls the on/off and power level functions of laser 10, and, if variable, the dimensions of aperture 16

Substrate 30 is itself secured to workpiece holder 26 which is adapted to translate the substrate in both X and Y directions although, in general, only one axis is needed to make a trench. In the preferred embodiment, the location of beam 20 is fixed and the workpiece is moved, although, for purposes of explanation, the beam may be described as moving with respect to the substrate. Controller 5 also controls the X and Y movement along with the velocity of such movement of substrate 30.

As shown in FIG. 1, a trench 32 may be formed in substrate 30 by moving beam 20 from an initial position $22_i$ at a velocity V to a final position $22_f$. The beam image has a rectangular configuration (although any other configuration may be utilized) with a dimension W in the scanning direction and a dimension U in the direction transverse to the scanning direction. In practice, as the beam travels along the path, it ablates material from the surface of the substrate to create a microstructure of depth D, width U and, as discussed above, a ramp at either end of slope R/V.

For non-rectangular shapes, or any shape where the dimension W parallel to the direction of motion is not constant across the direction normal to the direction of motion, shapes other than planar ramps will be produced. However, for any section of the trench parallel to the direction of motion, and the corresponding dimension W of the aperture along that section, the relations $$D=R*W/V$$

and $$S=\pm R/V$$

still apply.

Figure 2A:
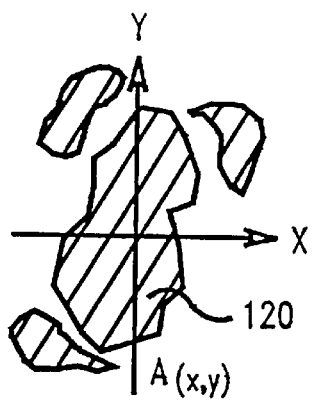
FIG. 2a is a graphical representation of an arbitrary energy beam having energy distribution A(x,y).
Figure 2B:
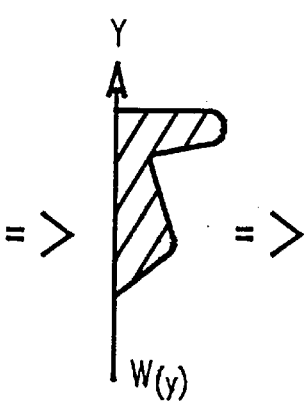
FIG. 2b is a graphical representation of the total illuminated width of the beam of FIG. 2a in the scanning direction.
Figure 2C:
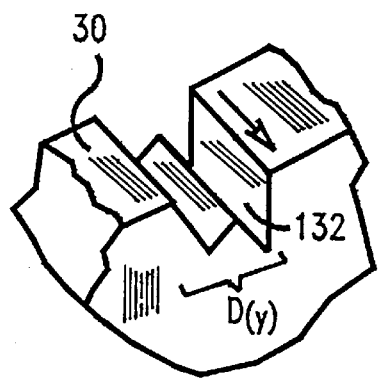

As shown in FIG. 2a, the beam energy 120 may be distributed in the image plane in any function of x and y, A(x,y), for example, a rectangle, diamond, circle, ellipse, an array of dots, or the like. If the scan direction is assumed to be in the x direction, a function W(y) shown in FIG. 2b describes the total illuminated width of the image in the x direction for any value of y, i.e., summing up the total amount of illuminated width along the x axis. The trench 132 created by scanning of beam 120 in the direction of the arrow is shown in FIG. 2c, which trench has the profile across its width of W(y). The equation D=RW/v still holds true for any value of W(y), such that it describes the function:

$$D(y)R*W(y)/V$$

Figure 3A:
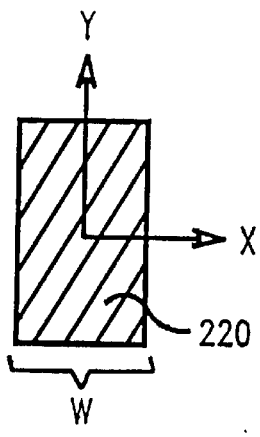
FIG. 3a is a graphical representation of a rectangular energy beam.
Figure 3B:
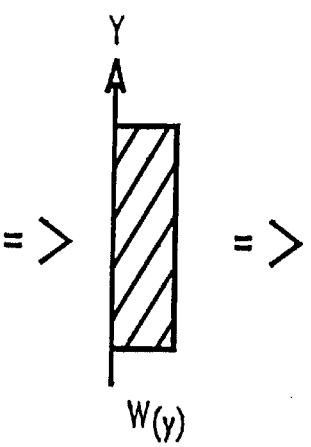
FIG. 3b is a graphical representation of the total illuminated width of the beam of FIG. 3a in the scanning direction.
Figure 3C:
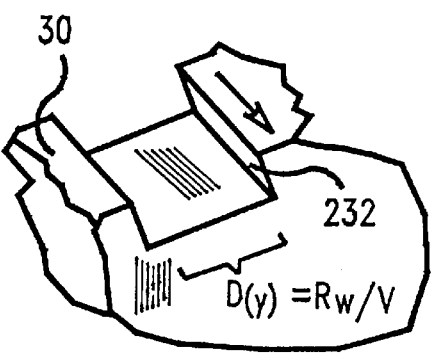

As shown in FIG. 3a, a rectangle of width W is scanned by beam 220 along the x axis, parallel to the side of length w. FIG. 3b shows the function W(y)=w, a constant, so the depth D(y)=Rw/V, is also constant. The trench 232 created by scanning of beam 220 in the x direction shown by the arrow is depicted in FIG. 2c, which trench has a constant profile across its width.

Figure 4A:
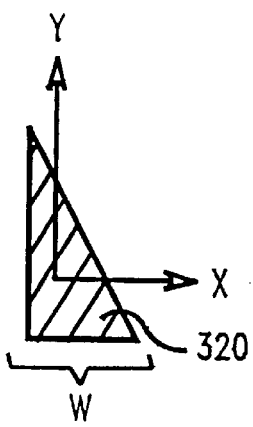
FIG. 4a is a graphical representation of a triangular energy beam.
Figure 4B:
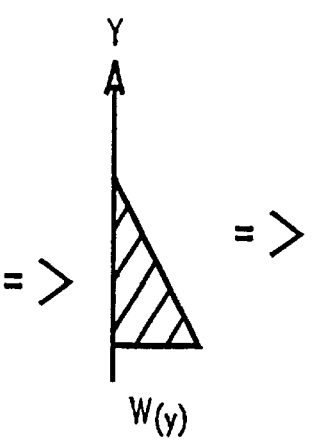
FIG. 4b is a graphical representation of the total illuminated width of the beam of FIG. 4a in the scanning direction.
Figure 4C:
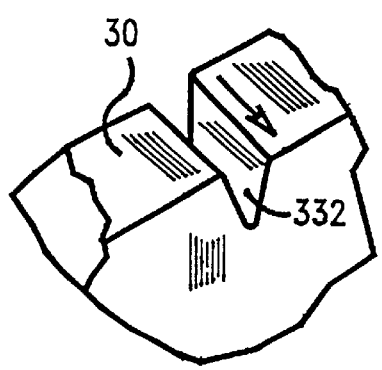

The general result described above also permits other shapes, for example, the triangle shaped beam 320 shown in FIG. 4a. The triangle has one side of length w along the x axis, the direction of scanning. The function W(y) is shown in FIG. 4b, where the function W(y)=w at the lower side of length w, and W(y)=0 at the upper vertex opposite it. The depth D at the one side of the trench 332 (FIG. 4c) corresponding to the side of width w is given by:

$$D(y)=R*w/V$$

and, at the opposite edge, is given by:

$$D(y)=R*0/v=0$$

The trench, exclusive of the ramps at the ends, has a tilted bottom. However, the slope of the ramps at the ends is still S=R/V, so it is unaffected by the function W(y).

Figure 5:
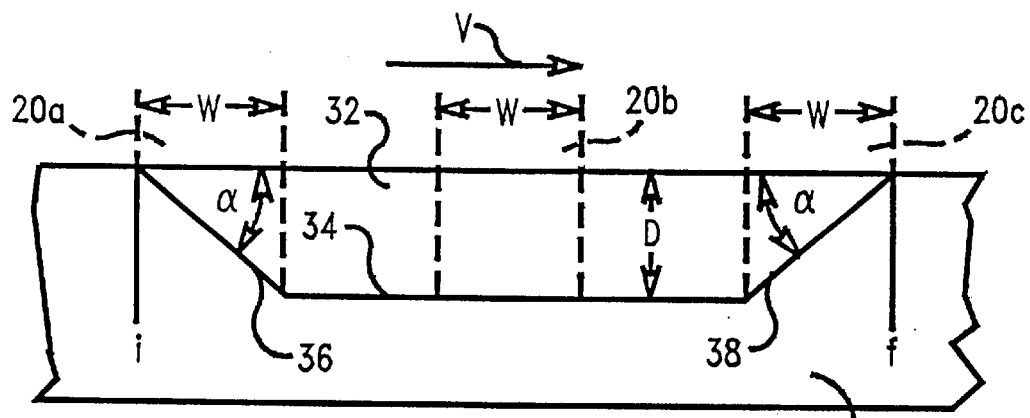
FIG. 5 is an elevational view along a trench in a semiconductor substrate made with controlled depth and inclination in accordance with the present invention.
Figure 6:
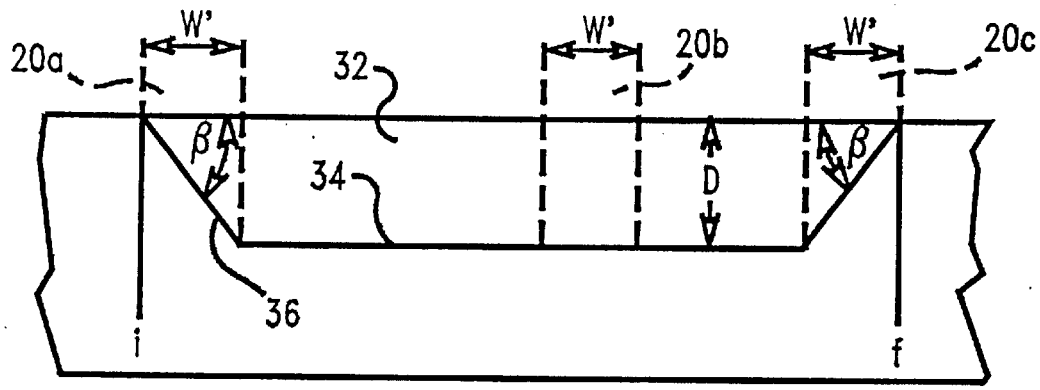
FIG. 6 is an elevational view along another trench in a semiconductor substrate made with controlled depth and inclination in accordance with the present invention.
Figure 7:
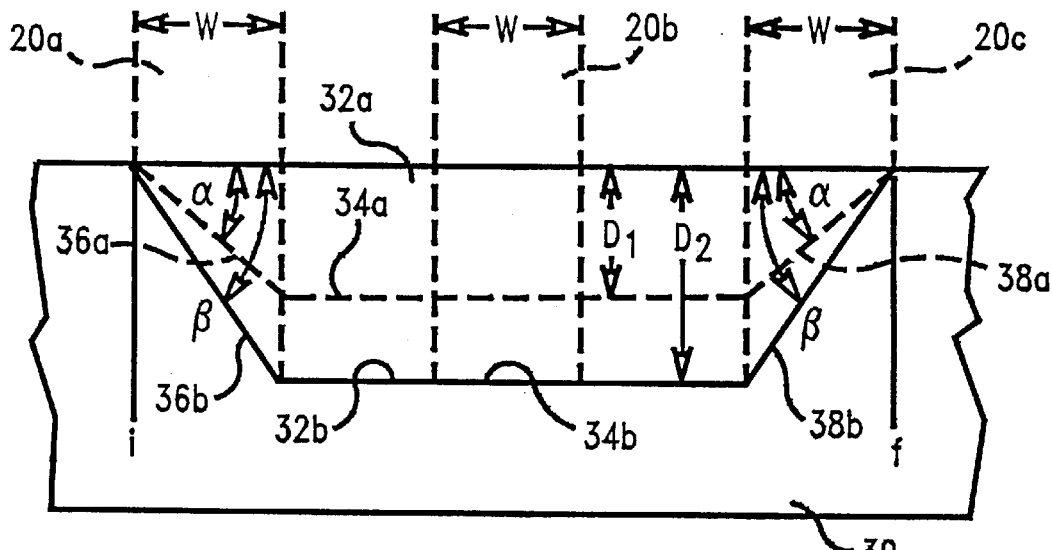
FIG. 7 is an elevational view along a trench in a semiconductor substrate made in two passes with controlled depth and inclination in accordance with the present invention.

Vertical cross sections along the ablation path of various trenches formed in accordance with the present invention are shown in FIG. 5, 6 and 7. In FIG. 5, a trench 32 formed by a laser beam extends from initial point i to final point f. A beam in initial position 20a travels at velocity V upon startup and creates an initial downward ramp 36 at angle α along dimension W. As the beam travels through intermediate position 20b along the length of trench 32, floor 34 is substantially of uniform depth D until the forward edge of the beam at position 20c reaches ending point f. The ramp 38 formed at the end of trench 32 is also of angle α. Angle a may be determined by arctan (D/W).

In FIG. 6, there is shown another trench 32 of floor 34 depth D, except that the laser beam is of substantially smaller dimension W' along the length of ablation of the material. As the beam in positions 20a, 20b, 20c travel at velocity V from starting point i to ending point f, the etch rate is controlled to provide a depth of ablation D. Angle β of initial and final ramps 36, 38, respectively, is substantially steeper than angle α of FIG. 5. Thus, the angle of the initial and final ramps of trench 32 may be controlled by the velocity V of the beam with respect to the substrate, the etch rate R, or the dimension W' of the beam along the direction of ablation of substrate material.

FIG. 7 depicts further control of the trench depth and angle of initial and final ramps by the use of multiple passes of the laser in positions 20a, 20b, 20c. In a first pass, trench 32a having floor 34a is formed with initial and final ramps of 36a, 38a, respectively, of angle α. Floor 34a is of depth $D_1$. To increase both the depth and the angle of the trench ramps, a second pass of the beam is made through positions 20a, 20b, 20c to bring the floor of the trench lower to position 32b (depth $D_2$) with the angle of the initial and final ramps 36b, 38b now shown as β. Thus, multiple passes may also be utilized to control the depth and angle of ramps of the trench formed in a microstructure of the substrate.

It should be noted that the shape of a cut made by an excimer laser does not exactly mimic the integrated intensity W(y) due to waveguiding of the excimer light by the walls of the trench. For example, a rectangular beam scanned across a surface may produce a trench which is slightly deeper at the corners than at the center because of this effect. It is believed that the equations described herein are substantially correct, particularly for describing the effects of multiple laser passes, changes in the ablation rate, different velocities and the like. However, the aforementioned trench wall waveguiding effect should always be taken into consideration.

Accordingly, the aforementioned invention may control the velocity, laser image dimension and etch rate with available equipment to more precisely control the inclination of the trenches created by laser and other energy beam ablation in substrates such as polymer planar waveguides or semiconductor wafers.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of controlling inclination and depth of ablation of a workpiece by an energy beam comprising the steps of:
   a) providing a workpiece;
   b) generating an energy beam and directing said beam at said workpiece to ablate portions of the surface thereof;
   c) moving the workpiece relative to said beam at a velocity to create a path of ablated material from the workpiece surface, said path of ablated material having ramps at each end of said path; and
   d) controlling the velocity of said workpiece relative to ablation rate of material from the workpiece surface to create a desired inclination of said ramps and depth of ablated material in said path.

2. The method of claim 1 wherein said beam has a width along the path of ablated material having said ramps at each end thereof and wherein the depth of ablated material is a function of said beam width, workpiece velocity and ablation rate.

3. The method of claim 2 wherein the depth of ablated material is substantially controlled by the formula:

$$D=R*(W/V)$$

wherein D is the depth of ablated material, R is ablation rate, W is beam dimension along the path of ablated material, and V is workpiece velocity relative to the beam.

4. The method of claim 2 wherein the ramps at each end of said path of ablated material have slopes substantially determined by the formula:

$$S=\pm R/V$$

wherein S is the slope of the ramps of ablated material at each end of said path,
   R is ablation rate, and V is workpiece velocity relative to the beam.

5. The method of claim 1 wherein said step (b) generates a continuous wave laser beam.

6. The method of claim 1 wherein said step (b) generates a pulsed laser beam.

7. A method of controlling inclination and depth of ablation of a workpiece by an energy beam comprising the steps of:
   a) providing a workpiece;
   b) generating an energy beam and directing said beam at said workpiece to ablate portions of the surface thereof;
   c) moving the workpiece relative to said beam to create a path of ablated material from the workpiece surface, said path of ablated material having ramps at each end of said path; and
   d) controlling the dimension of said beam along the path of ablated material to create a desired inclination of said ramps and depth of ablated material in said path.

8. The method of claim 7 wherein said workpiece has a velocity relative to the beam and wherein the depth of the path of ablated material having said ramps at each end thereof is a function of said beam dimension, workpiece velocity and ablation rate.

9. The method of claim 8 wherein the depth of ablated material is substantially controlled by the formula:

$$D=R(W/V)$$

wherein D is the depth of ablated material, R is ablation rate, W is beam dimension along the path of ablated material, and V is workpiece velocity.

10. The method of claim 8 wherein the ramps at each end of said path of ablated material have slopes substantially determined by the formula:

$$S=\pm R/V$$

wherein S is the slope of the ramps of ablated material at each end of said path,
   R is ablation rate, and V is workpiece velocity relative to the beam.

11. The method of claim 7 wherein said step (b) generates a continuous wave laser beam.

12. The method of claim 7 wherein said step (b) generates a pulsed laser beam.

13. A method of controlling inclination and depth of ablation of a workpiece by an energy beam comprising the steps:
   a) providing a workpiece;
   b) generating an energy beam and directing said beam at said workpiece to ablate portions of the surface thereof;
   c) creating a path of ablated material having ramps at ends thereof by moving said workpiece relative to said energy beam at a velocity whereby said energy beam forms an initial ramp at a first end of said path, travels along a length of said path, and forms a final ramp at a second end of said path; and
   d) controlling the velocity of said workpiece relative to ablation rate of material from the workpiece surface to create desired inclinations of said initial and final ramps of said path and a desired depth of said path of ablated material.

14. The method of claim 13 further including the step:
   e) directing said energy beam at said path of ablated material; and
   f) increasing said inclinations of said initial and final ramps of said path and said depth of said path of ablated material using said energy beam.

15. The method of claim 13 wherein the depth of ablated material is substantially controlled by the formula:

$$D=R*(W/V)$$

wherein D is the depth of ablated material, R is ablation rate, W is beam
   dimension along the path of ablated material, and V is workpiece velocity relative to the beam.

16. The method of claim 13 wherein said initial and final ramps have slopes substantially determined by the formula:

$$S=\pm R/V$$

wherein S is the slope of the ramps of ablated material at each end of said path,
   R is ablation rate, and V is workpiece velocity relative to the beam.

17. The method of claim 13 wherein said step (c) said energy beam forms said initial ramp at said first end of said path by ablating said workpiece down from a top surface of said workpiece to a bottom of said path, and forms said final ramp at said second end of said path by ablating said workpiece up from said bottom of said path to said top surface of said workpiece.

18. A method of controlling inclination and depth of ablation of a workpiece by an energy beam comprising the steps of:
   a) providing a workpiece;
   b) generating an energy beam and directing said beam at said workpiece to ablate portions of the surface thereof;

c) creating a path of ablated material having ramps at ends thereof by moving said workpiece relative to said energy beam whereby said energy beam forms an initial ramp at a first end of said path, travels along a length of said path, and forms a final ramp at a second end of said path; and d) controlling the dimension of said beam along the path of ablated material to create desired inclinations of said initial and final ramps of said path and a desired depth of said path of ablated material.

19. The method of claim 18 further including the step:

e) directing said energy beam at said path of ablated material; and f) increasing said inclinations of said initial and final ramps of said path and said depth of said path of ablated material using said energy beam.

20. The method of claim 18 wherein the depth of ablated material is substantially controlled by the formula:

$$D=R*(W/V)$$

wherein D is the depth of ablated material, R is ablation rate, W is beam dimension along the path of ablated material, and V is workpiece velocity relative to the beam.

21. The method of claim herein said initial and final ramps have slopes substantially determined by the formula:

$$S=\pm R/V$$

wherein S is the slope of the ramps of ablated material at each end of said path, R is ablation rate, and V is workpiece velocity relative to the beam.

22. The method of claim 18 wherein said step (c) said energy beam forms said initial ramp at said first end of said path by ablating said workpiece down from a top surface of said workpiece to a bottom of said path, and forms said final ramp at said second end of said path by ablating said workpiece up from said bottom of said path to said top surface of said workpiece.

* * * * *

UNITED STATES PATENT AND TRADEMARK OFFICE
CERTIFICATE OF CORRECTION

PATENT NO. : 6,313,434 B1
DATED : November 6, 2001
INVENTOR(S) : Patterson et al.

It is certified that error appears in the above-identified patent and that said Letters Patent is hereby corrected as shown below:

<u>Column 10,</u>
Line 3, delete "herein" and substitute therefor -- 18 wherein --.

Signed and Sealed this

Fourteenth Day of May, 2002

*Attest:*

*Attesting Officer*

JAMES E. ROGAN
*Director of the United States Patent and Trademark Office*